April 12, 1966　　　J. B. JONES　　　3,245,892
METHOD FOR ULTRASONICALLY ACTIVATING CHEMICAL REACTIONS
REQUIRING THE PRESENCE OF A CATALYST
Filed Sept. 14, 1960　　　2 Sheets-Sheet 1

INVENTOR.
JAMES BYRON JONES
BY Arthur H. Seidel
ATTORNEY

INVENTOR.
JAMES BYRON JONES
BY Arthur H. Seidel
ATTORNEY

United States Patent Office 3,245,892
Patented Apr. 12, 1966

3,245,892
METHOD FOR ULTRASONICALLY ACTIVATING CHEMICAL REACTIONS REQUIRING THE PRESENCE OF A CATALYST
James Byron Jones, West Chester, Pa.
Filed Sept. 14, 1960, Ser. No. 56,020
2 Claims. (Cl. 204—154)

The present application is a continuation-in-part of my copending application Serial No. 582,147 entitled Ultrasonic Tool, filed May 2, 1956, now U.S. Patent No. 3,029,766, issued April 17, 1962.

This invention relates to an ultrasonic catalyst. More particularly, the present invention relates to an apparatus and method for ultrasonically activating chemical reactions requiring the presence of a catalyst.

A catalyst is any substance whose presence changes the rate of a chemical reaction without itself undergoing permanent change in its composition. Catalysts may be used to accelerate or retard the chemical reaction. Most inorganic catalysts are metals and metal oxides. Catalytical effects surface phenomena. Ultrasonic catalysts produce surface effects and greatly enhance the catalytic reaction if the surface area of the catalyst is increased. Heretofore, it has been impractical to excite a large surface area of a catalyst.

I have found that the provision of a plurality of fine wires joined to the end of an ultrasonic coupler results in the provision of many feet of surface of the wires which become ultrasonic radiators when immersed in a gas, liquid, or semi-liquid. The effect thereof is to enhance the catalytic action, thereby increasing or decreasing the time element, and also reduce the amount of catalyst required for a particular chemical reaction. The catalyst may be the wires themselves or may be a porous coating on the wires. By immersing substantially the entire length of the wires in the fluid, substantially the entire length of the wires are utilized as a catalyst.

It is an object of the present invention to provide a novel ultrasonic catalyst.

It is another object of the present invention to provide an ultrasonic catalyst having a plurality of flexible vibration-transmitting members emanating from a single transducer.

It is another object of the present invention to provide a novel ultrasonically excited catalyst capable of effecting a chemical reaction within a container without transmitting any appreciable amount of ultrasonic energy to the container.

It is still another object of the present invention to provide a novel ultrasonically excited catalyst capable of effecting a chemical reaction within a continuous process.

Other objects will appear hereinafter.

For the purpose of illustrating the invention there is shown in the drawings a form which is presently preferred; it being understood, however, that this invention is not limited to the precise arrangements and instrumentalities shown.

Figure 1:
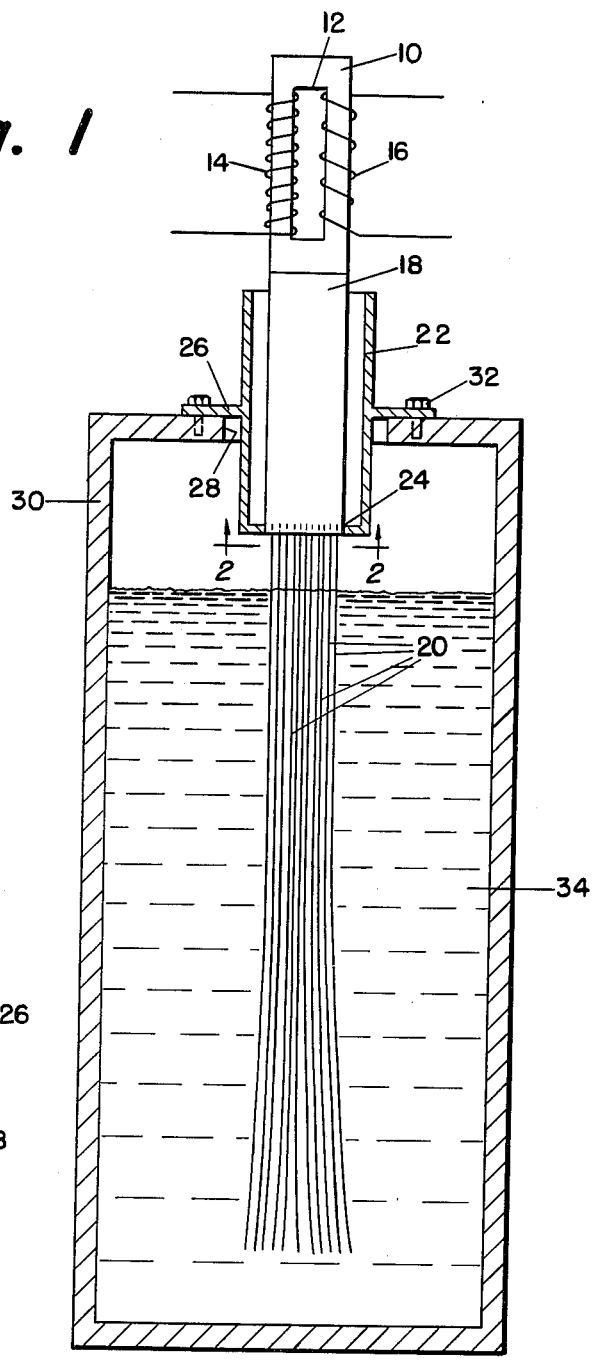
FIGURE 1 is a cross-sectional view of the ultrasonic catalyst of the present invention disposed within a fluid containing tank.
Figure 2:
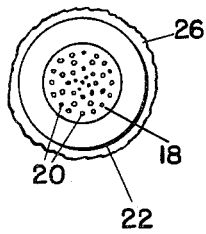
FIGURE 2 is a cross-sectional view taken along lines 2—2 in FIGURE 1.

Referring to the drawing in detail, wherein like numerals indicate like elements, there is shown in FIGURE 1 a transducer 10.

The transducer 10 is preferably a magnetostrictive transducer which may comprise a nickel stack of known design. In place of nickel, other magnetostrictive materials such as the alloy Permendur (an iron-cobalt alloy) or nickel-iron alloys, or alfanol (an aluminum-iron alloy), may be utilized. A wide variety of magnetostrictive transducers are known to those skilled in the art and the construction of the transducer need not be described in detail. The magnetostrictive transducer 10 is provided with a rectangular opening 12. A polarizing coil 14 and an excitation coil 16 are wound through the opening 12 within the transducer 10. The desirability of magnetically polarizing the transducer 10 by means of the polarizing coil 14 in order for the metal laminations in the transducer 10 to efficiently convert the applied R.F. energy from the excitation coil 16 into vibratory energy will be readily understood by those skilled in the art.

While the magnetostrictive transducer 10 is sometimes preferred, it will be obvious to those skilled in the art that other elastic vibratory energy means may be substituted therefor. For example, the piezoelectric ceramics such as barium titanate and lead titanate-zirconate can be used in place of the magnetostrictive transducer 10.

A coupler bar 18 of metal, such as stainless steel, is joined in axial end-to-end contact with the magnetostrictive transducer 10. The end-to-end contact may be achieved by brazing, welding, or the like. A plurality of sockets are provided on the end of the coupler bar 18. A plurality of wires 20 are secured in the sockets in the coupler bar 18 with the uppermost tip portion of each wire brazed, welded or soldered within one of the sockets. As used hereinafter the joint between the wires 20 and the coupler bar 18 may be referred to as a fused metal joint. The wires 20 may be any one of a plurality of catalysts. Alternatively, the surface of the wires 20 may be coated with a porous catalyst. The wires 20 may have physical characteristics of flexibility permitting them to be bent or curved by digital manipulation so as to remain spaced from one another.

The over-all cumulative length of the coupler bar 18 and each of the wires 20 is preferably but not necessarily equal to an even number of one-quarter wavelengths according to the properties of the metal forming the coupler bar 18 and the wires 20 at its applied frequency of operation. It is, of course, not necessary that each of the wires 20 be of the same length.

A force insensitive hermetically sealable mount is provided for the coupler bar 18 for a purpose to be described hereinafter. The mount comprises a shell 22 rigidly secured at one end to the coupler bar 18. The shell 22 is secured to the coupler bar 18 at point 24 while the other end of the shell 22 is free from attachment to the coupler bar 18. An annular flange 26 is provided on the shell 22 midway between the ends of the shell 22.

The shell 22 is cylindrical and has a length equal to at least a single one-half wavelength according to the metal used for the shell at the applied frequency. The shell 22 may have a length of but a single one-half wavelength or may have a length of a plurality of one-half wavelengths. The flange 26 is positioned at the node one-quarter wavelength or odd number multiples thereof from the free end of the shell 22. The thickness of flange 26 is not critical, however it should be relatively thin. As a general rule, the thickness of flange 26 should be the minimum consonant with securing desired strength characteristics.

The attachment point 24 between the shell 22 and the coupler bar 18 should be at a point of minimum stress, that is an anti-node or loop. Since the shell 22 is joined to the coupler bar 18 at an anti-node or loop, and since the flange 26 is provided at a node, the mount for the coupler bar 18 is hermetically sealable and force-insensitive. Thus, no appreciable vibratory energy will be transmitted to the tank 30. The tank 30 is provided with an opening 28 through which extends the lower portion of the shell 22, the coupler bar 18, and the wires 20. The tank 30 and the flange 26 are fixedly secured, by any conventional means such as bolts 32, so as to provide a hermetic seal.

The tank 30 contains the fluid 34 which is undergoing a chemical reaction. The fluid 34 may be a gas, liquid, or semi-liquid. Substantially the entire length of the wires 20 are in contact with the fluid 34. The wires 20 are axially disposed with relation to the longitudinal axis of the coupler bar 18, therefore the mechanical vibrations of the coupler bar 18 will cause longitudinal vibrations in the wires 20. Therefore, substantially the entire length of the wires 20 will act as an ultrasonic radiator.

The operative range of vibratory frequencies of the transducer 10 may include frequencies within the range 59 to 800,000 cycles per second, with the preferred range constituting 500 to 300,000 cycles per second. This preferred range of operating frequencies may be readily achieved by transducer elements of known design, which are capable of generating elastic vibratory energy of high intensity.

The wires 20 may be the catalyst or may be coated with particles of a porous catalytic material. In certain reactions, it is necessary for the catalyst to have a high temperature. The temperature of the coupler bar and the wires 20 may be elevated in any conventional manner.

The present invention may be utilized to accomplish, enhance or retard any one of a plurality of chemical reactions. For example, a hot platinum wire in a gaseous mixture of oxygen and hydrogen results in water; a ferrous wire in hydrogen and nitrogen results in $NH_3$; a hot platinum wire in alcohol results in acetic acid; a platinum or gold wire in hydrogen peroxide causes a decomposition into oxygen and hydrogen; a copper or silver wire in methanol results in formaldehyde; a nickel, cobalt or iron wire in methane and water results in carbon monoxide and hydrogen; a copper, silver or platinum wire in carbon monoxide and hydrogen results in methyl alcohol.

Also, an iron, copper or nickel wire can be used in the cracking of hydrocarbons to carbon and hydrogen; a copper, silver or nickel wire can be used in the dehydrogenation of alcohols to aldehydes or ketones; a copper, iron or nickel wire in $C_2H_2$ results in cuprene and polymers; an iron wire can be used to form cyanide from $Na_2CO_3$, C and $N_2$; a nickel wire in liquid fats and hydrogen results in solid fats; a copper or manganese oxide wire in carbon monoxide and oxygen results in carbon dioxide; a platinum wire in ammonia and oxygen results in nitric acid; and platinum or vanadium wire oxide in sulfur dioxide and oxygen results in sulfur trioxide.

The present invention is utilized in the following manner:

The tank 30 is substantially filled with the fluids 34 to be treated or chemically reacted. The flange 26 on the shell 22 is rigidly secured to the tank 30 by the bolts 32 with the wires 20 substantially immersed within the fluid 34. The vibratory energy generated by the transducer 10 is transmitted to the wires 20. The wires 20 act as an ultrasonic catalyst to the chemical reaction taking place within the tank 30. Alternatively, the wires 20 may be coated with a plated, porous, film-like catalyst. The ultrasonic vibrations of the wires 20 increase the rate of the catalytic effect and reduce the amount of catalyst required for a particular chemical reaction.

Figure 3:
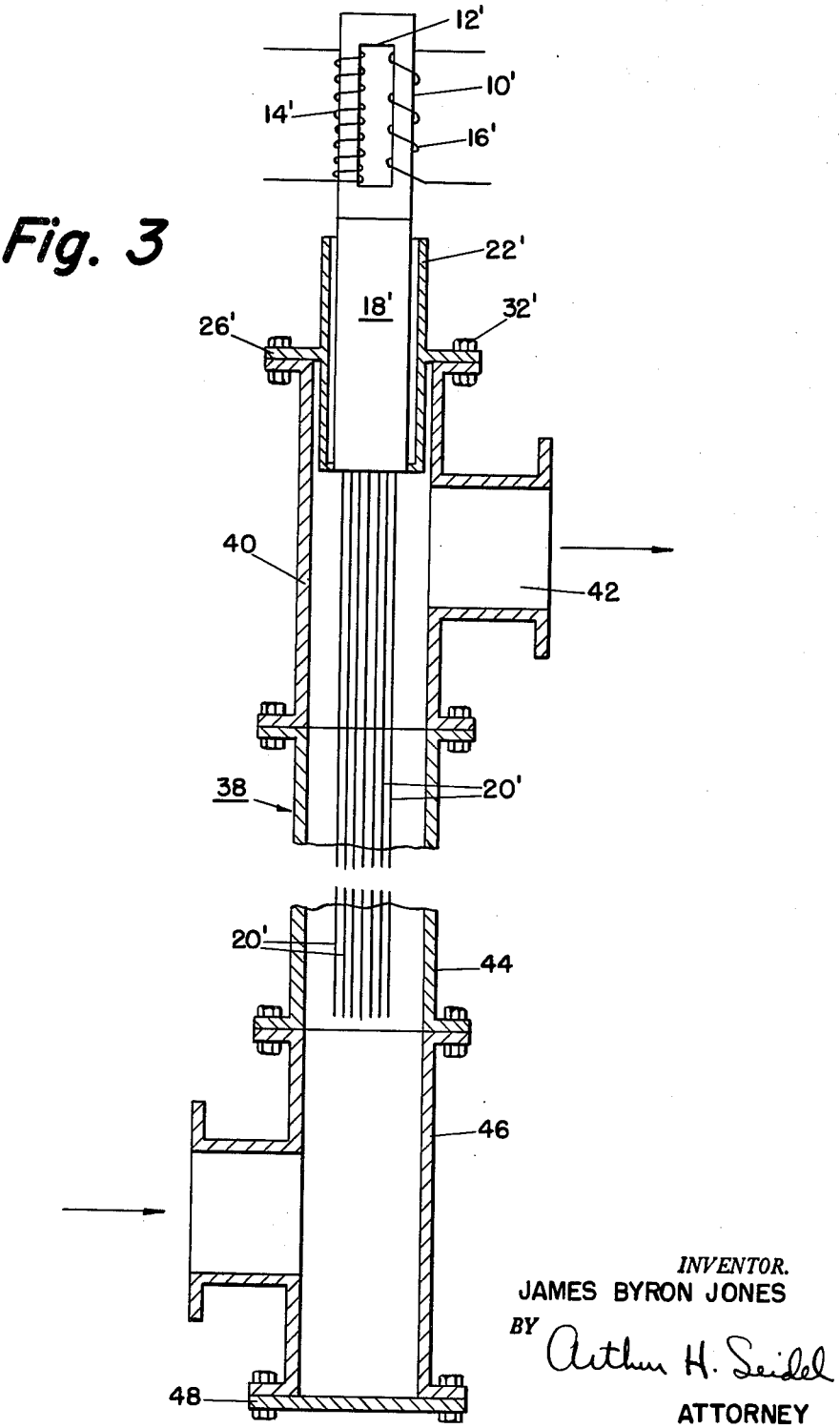
FIGURE 3 is a cross-sectional view of another embodiment wherein an ultrasonic catalyst is disposed within a pipe of a continuous process.

FIGURE 3 discloses another embodiment of the present invention which is particularly directed toward effecting chemical reactions in a continuous process as compared with a batch-wise process as shown in FIGURE 1.

The ultrasonically excited catalyst in FIGURE 3 is identical with the catalyst shown in FIGURE 1. Therefore, the corresponding elements in FIGURE 3 are shown with primed numerals.

The ultrasonically excited catalyst in FIGURE 3 is capable of effecting a chemical reaction in a portion 38 of a continuous process. The portion 38 includes a T-coupling 40 having an outlet port 42, a pipe 44 having one end threaded to one of the arms of the T-coupling 40, and a T-coupling 46 threaded to the other end of the pipe 44. The shell 22' is hermetically sealed to the other arm of the T-coupling 40 by bolts 32'. The wires 20' extend axially from the coupler bar 18' through the T-coupling 40 into the pipe 44 so that substantially the entire length of the wires 20' is exposed to the moving fluid.

The T-coupling 46 is provided with a removable cap 48. If the rate of flow of the fluid through the portion 38 is very high, it may be necessary to remove the cap 48 and mount a second ultrasonically excited catalyst on the T-coupling 46. The second catalyst would be mounted on the T-coupling 46 in the same manner as the first catalyst is mounted on coupling 40 with the wires of the catalysts extending into pipe 44 toward each other.

The apparatus in FIGURE 3 operates in the same manner as the apparatus shown in FIGURE 1. The fluid of a continuous process flows through the portion 38 in the direction of the arrows shown in FIGURE 3. If desired, the direction of flow may be reversed. In either case, it is to be noted that the wires 20' vibrate in a direction parallel to the direction of flow.

Alternatively, the wires 20 and 20' may take the form of perforated tubes thereby providing an inner and outer surface for contact with the fluids undergoing a chemical reaction. In this manner, the rate of the action and the amount of catalyst necessary may be reduced even further. Hereinafter, the wires 20 and 20' may be referred to as flexible elongated vibrating members. Also, the transducers 10 and 10' may be referred to as a vibration-generating means.

The present invention may be embodied in other specific forms without departing from the spirit or essential attributes thereof and, accordingly, reference should be made to the appended claims, rather than to the foregoing specification as indicating the scope of the invention.

I claim:

1. A method of catalytically effecting a chemical reaction in a fluid which comprises the steps of immersing substantially the entire length of a plurality of elongated members in the fluid, with each of said elongated members having a catalyst on its surface, and catalytically effecting a chemical reaction in the fluid by mechanically ultrasonically vibrating said elongated members.

2. A method in accordance with claim 1 in which the fluid is continuously moved past the vibrating members.

References Cited by the Examiner

UNITED STATES PATENTS

| | | | |
|---|---|---|---|
| 1,939,712 | 12/1933 | Mahoux | 204—154 |
| 2,096,011 | 10/1937 | Smith | 204—137 |
| 2,500,008 | 3/1950 | Richardson | 204—193 |
| 2,633,477 | 3/1953 | Rollman | 23—288 X |
| 2,742,408 | 4/1956 | La Porte | 204—154 |
| 3,029,766 | 4/1962 | Jones | 204—154 |

JOHN H. MACK, *Primary Examiner.*

JOHN R. SPECK, MURRAY TILLMAN, WINSTON A. DOUGLAS, *Examiners.*

H. S. WILLIAMS, *Assistant Examiner.*